United States Patent
Mazenc

(10) Patent No.: US 10,240,550 B2
(45) Date of Patent: Mar. 26, 2019

(54) METHOD FOR DETERMINING THE ANGULAR POSITION OF AN ENGINE BY WAY OF A CRANKSHAFT SENSOR AND A CAMSHAFT SENSOR

(71) Applicants: Continental Automotive France, Toulouse (FR); Continental Automotive GmbH, Hannover (DE)

(72) Inventor: Christophe Mazenc, Toulouse (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 15/769,984

(22) PCT Filed: Oct. 20, 2016

(86) PCT No.: PCT/EP2016/001738
§ 371 (c)(1),
(2) Date: Apr. 20, 2018

(87) PCT Pub. No.: WO2017/071798
PCT Pub. Date: May 4, 2017

(65) Prior Publication Data
US 2018/0313288 A1    Nov. 1, 2018

(30) Foreign Application Priority Data

Oct. 26, 2015 (FR) ...................................... 15 60189

(51) Int. Cl.
*G01M 15/06* (2006.01)
*F02D 41/22* (2006.01)
(Continued)

(52) U.S. Cl.
CPC ............ *F02D 41/22* (2013.01); *F02D 41/009* (2013.01); *G01D 5/00* (2013.01); *G01D 5/142* (2013.01);
(Continued)

(58) Field of Classification Search
USPC ............................................. 73/114.26, 114.27
See application file for complete search history.

(56) References Cited

U.S. PATENT DOCUMENTS 5,622,153 A    4/1997 Ott et al.
5,715,780 A *  2/1998 Haller ................. F01L 1/34406
                                                 123/90.17

(Continued)

FOREIGN PATENT DOCUMENTS

DE    4434833 A1    4/1996
FR    2874655 A1    3/2006
(Continued)

OTHER PUBLICATIONS

English translation of the Written Opinion for International Application No. PCT/EP2016/001738, dated Nov. 30, 2016, 6 pages.
(Continued)

*Primary Examiner* — Eric S. McCall
(74) *Attorney, Agent, or Firm* — RatnerPrestia

(57) ABSTRACT

A method for determining the angular position of an engine by a crankshaft sensor and a camshaft sensor. The method includes production by the crankshaft sensor of a revolution event, determination of the angular position of the camshaft by identifying the start-of-tooth and end-of-tooth events following the revolution event, in rapid mode, over at most one revolution of the crankshaft, if a no tooth event occurs after the revolution event and if the determination of the angular position of the camshaft fails, the method continues with a step of determining the angular position of the
(Continued)

camshaft by identification, in slow mode, over at least two crankshaft revolutions.

10 Claims, 2 Drawing Sheets

(51) Int. Cl.
    *F02D 41/00*     (2006.01)
    *G01D 5/14*     (2006.01)
    *G01D 5/245*     (2006.01)
    *G01D 5/00*     (2006.01)

(52) U.S. Cl.
    CPC ....... *G01D 5/2457* (2013.01); *F02D 2250/06* (2013.01); *Y02T 10/40* (2013.01)

(56) References Cited

U.S. PATENT DOCUMENTS

| | | | |
|---|---|---|---|
| 2003/0163247 A1* | 8/2003 | Kobayashi | F02D 41/009 701/114 |
| 2006/0052932 A1* | 3/2006 | Meyer | F02D 41/009 701/115 |
| 2007/0292120 A1* | 12/2007 | Galtier | F02D 41/009 396/110 |
| 2008/0245142 A1* | 10/2008 | Bowling | G01M 15/06 73/114.26 |
| 2017/0175654 A1* | 6/2017 | Eom | F02D 41/009 |
| 2018/0031594 A1* | 2/2018 | Joseph | F02D 41/009 |

FOREIGN PATENT DOCUMENTS

| | | |
|---|---|---|
| JP | 2010106661 A | 5/2010 |
| KR | 20040041429 A | 5/2004 |

OTHER PUBLICATIONS

International Search Report and Written Opinion for International Application No. PCT/EP2016/001738, dated Nov. 30, 2016, 8 pages.

* cited by examiner

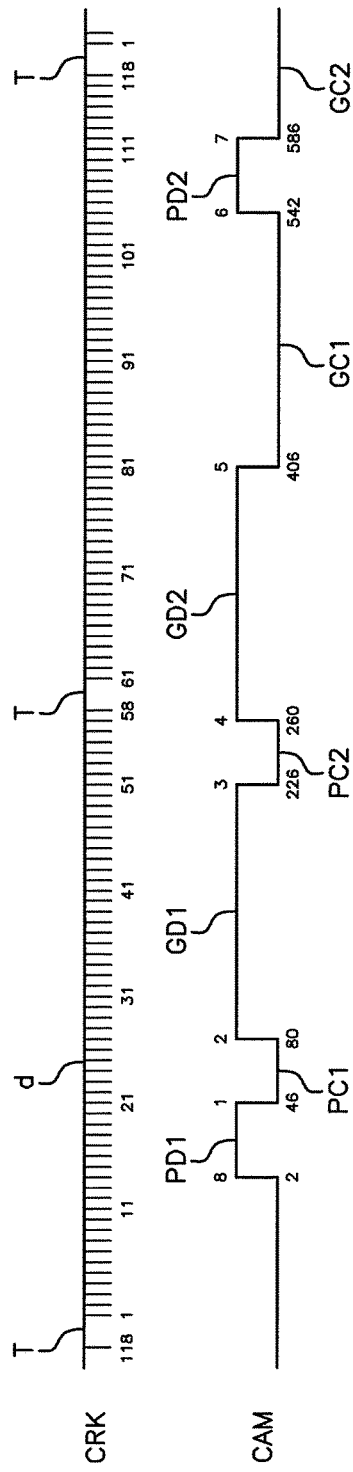
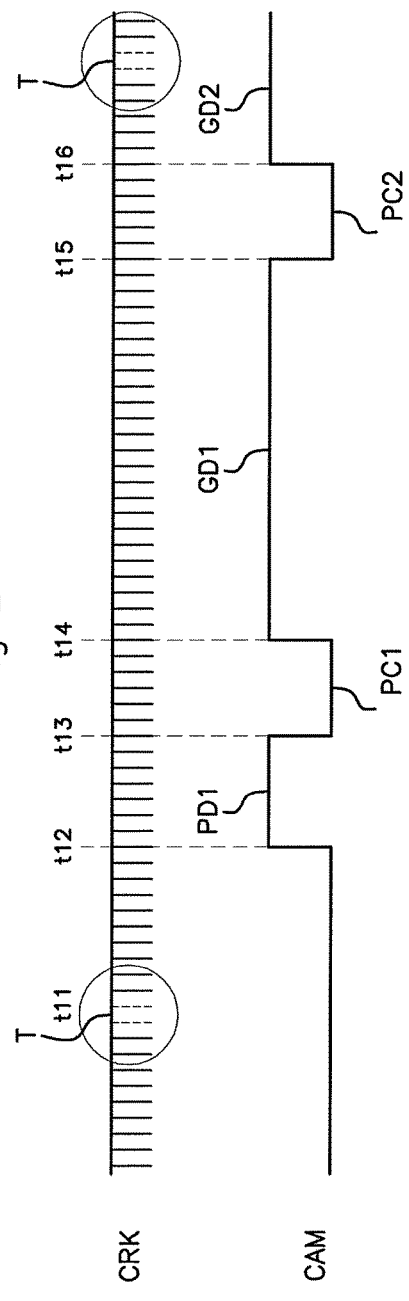

METHOD FOR DETERMINING THE ANGULAR POSITION OF AN ENGINE BY WAY OF A CRANKSHAFT SENSOR AND A CAMSHAFT SENSOR

CROSS REFERENCE TO RELATED APPLICATIONS

This application is the U.S. National Phase Application of PCT International Application No. PCT/EP2016/001738, filed Oct. 20, 2016, which claims priority to French Patent Application No. 1560189, filed Oct. 26, 2015, the contents of such applications being incorporated by reference herein.

FIELD OF THE INVENTION

The present invention relates to a method for synchronizing an engine.

BACKGROUND OF THE INVENTION

Synchronizing an engine is the operation that consists in determining the angular position of an engine. This determination is essential in order then to be able to control the engine and to inject fuel at the appropriate moment in the engine cycle, for example.

To this end, an engine, such as an internal combustion engine, includes a crankshaft sensor and at least one camshaft sensor.

A crankshaft sensor comprises a crankshaft toothed wheel, joined to the crankshaft so as to rotate therewith and comprising a large number of regular teeth and a revolution marker. The crankshaft sensor also comprises a crankshaft detector facing said crankshaft toothed wheel and able to detect a presence/absence of material and thus to detect a tooth or a slot.

The crankshaft toothed wheel is angularly divided equally into a large number of regular teeth, thus making it possible to accurately ascertain the angular position of the crankshaft. The crankshaft toothed wheel also comprises a revolution marker, enabling an absolute referencing of a given angular position once per revolution. Said revolution marker is generally associated with a position of the engine, such as, conventionally, the top dead center of the first cylinder.

However, for a four-stroke engine, a crankshaft performs exactly two revolutions per engine cycle. Therefore, ascertaining the angular position of the revolution marker is not enough to indicate the angular position of the engine, since said position is known with an uncertainty of one revolution out of two.

In order to specify which revolution out of two the engine is on, use may be made of a camshaft sensor.

A camshaft sensor comprises a camshaft toothed wheel, joined to a camshaft so as to rotate therewith and comprising a small number of teeth that are advantageously irregular. The camshaft sensor also comprises a camshaft detector facing said camshaft toothed wheel and able to detect a presence/absence of material and thus to detect a tooth or a slot.

The small number of teeth of the camshaft toothed wheel does not make it possible to accurately ascertain the angular position of the camshaft and therefore of the engine. However, a camshaft performs exactly one revolution per engine cycle. Therefore, this feature makes it possible to remove doubt with regard to which crankshaft revolution out of two is involved and thus, alongside the information obtained from the crankshaft sensor, to completely determine the angular position of the engine.

Said removal of doubt/determination of the crankshaft revolution out of two is achieved by identifying the teeth and slots of the camshaft toothed wheel on the basis of their respective length, resulting from a known camshaft toothed wheel profile.

Said removal of doubt/determination is typically achieved as quickly as possible, in fast mode, as soon as a match with said profile is confirmed.

However, such an operating mode may be deceived, in a detrimental manner, if the engine changes its direction of rotation and rotates in the reverse direction. If an engine is deemed to be synchronized, while it is rotating in the reverse direction, an injection of fuel may be ordered, which may lead to adverse effects for the engine.

SUMMARY OF THE INVENTION

Therefore, an aspect of the invention proposes a method for synchronizing an engine that is able to detect a rotation in the reverse direction and to prevent synchronization in this case.

An aspect of the invention is a method for determining the angular position of an engine by way of a crankshaft sensor comprising a crankshaft detector facing a crankshaft toothed wheel, performing two revolutions per engine cycle, and comprising a large number of regular teeth and a revolution marker, the crankshaft detector being able to produce a 'tooth' event corresponding to an edge for each of said teeth, a 'revolution' event for the revolution marker, and a 'missing tooth' event when two successive 'tooth' events are abnormally far apart, and of a camshaft sensor comprising a camshaft detector facing a camshaft toothed wheel, performing one revolution per engine cycle, and comprising a small number of irregular teeth, the camshaft detector being able to produce a 'tooth start' event for each rising edge and a 'tooth end' event for each falling edge, comprising the following steps:

production of a 'revolution' event by the crankshaft sensor, determination of the angular position of the camshaft by identifying the 'tooth start' and 'tooth end' events following said 'revolution' event, in fast mode, over at most one crankshaft revolution, and if a 'missing tooth' event is produced after the 'revolution' event and if the determination of the angular position of the camshaft has failed, the method continues with a step of:

determination of the angular position of the camshaft by identifying the 'tooth start' and 'tooth end' events, in slow mode, over at least two crankshaft revolutions.

According to another feature, the determination of the angular position of the camshaft by identification in slow mode is continued in slow mode for as long as it fails.

According to another feature, a 'missing tooth' is not able to be produced within a window whose extent is said large number of teeth toleranced by +/− a tolerance of teeth following a 'revolution' event, preferably with a tolerance equal to 2 teeth.

According to another feature, the crankshaft toothed wheel is regularly angularly divided into 60 and comprises a large number of teeth equal to 58, and 2 consecutive missing teeth forming the revolution marker.

According to another feature, the camshaft toothed wheel comprises a small number of teeth equal to 4, comprising a first small tooth, followed by a first small cavity, followed by a first large tooth, followed by a second small cavity, followed by a second large tooth, followed by a first large cavity, followed by a second small tooth, followed by a second large cavity, a small tooth preferably extending over 44°, a large tooth preferably extending over 146°, a small cavity preferably extending over 34°, and a large cavity preferably extending over 136°, the angles being referenced in relation to an engine cycle.

BRIEF DESCRIPTION OF THE DRAWINGS

Other features, details and advantages of the invention will become more clearly apparent from the detailed description provided below by way of indication with reference to the drawings, in which:

FIG. 1 shows, on a timing diagram, a crankshaft signal and an opposite camshaft signal, over one complete engine cycle, FIG. 2 shows, on a timing diagram, a crankshaft signal and an opposite camshaft signal, in the case of an engine rotating in a forward direction.

DETAILED DESCRIPTION OF THE PREFERRED EMBODIMENTS

Figure 3:
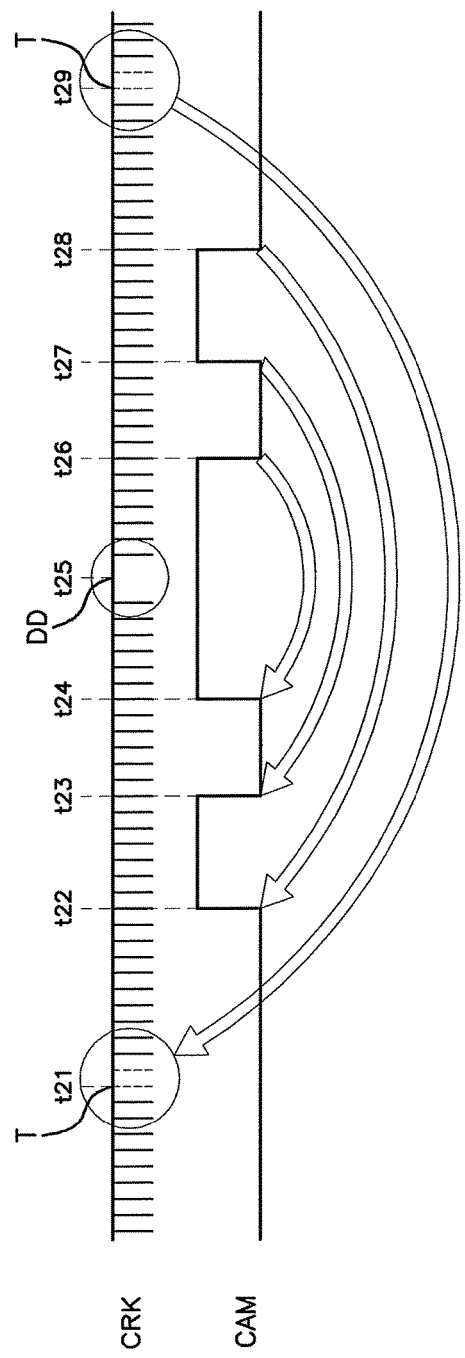
FIG. 3 shows, on a timing diagram, a crankshaft signal and an opposite camshaft signal, in the case of an engine rotating in a forward direction as far as a missing tooth DD and in the reverse direction afterwards.

The crankshaft is the output shaft of an engine. It rotates driven directly by the crank or cranks and performs two revolutions per engine cycle. A camshaft, controlling the valves, is a shaft driven indirectly, via a distribution transmission, by the crankshaft, and performs one revolution per engine cycle. An engine cycle is then conventionally referenced on the basis of the orientation angle of the crankshaft over 720°.

A crankshaft sensor or CRK (from 'crank') makes it possible to ascertain the angular position of the crankshaft. To this end, a crankshaft sensor comprises a crankshaft toothed wheel and a crankshaft detector arranged facing said crankshaft toothed wheel and able to detect a presence/absence of material and thus to detect a tooth or a slot. The crankshaft toothed wheel is joined to the crankshaft so as to rotate therewith, whereas the crankshaft detector is fixed. The crankshaft toothed wheel comprises a large number N of regular teeth and a single revolution marker that makes it possible to determine a particular angular position upon each revolution in an absolute fashion. The crankshaft toothed wheel is angularly divided equally into a large number of regular teeth, thus making it possible to accurately ascertain the angular position of the crankshaft, by counting the teeth, in relation to the revolution marker. Said revolution marker is generally associated with a position of the engine, such as, conventionally, the top dead center of a cylinder, for example the first cylinder.

The crankshaft detector positioned facing the crankshaft toothed wheel is able to detect a presence of, material facing a tooth and an absence of material facing a cavity or slot. The crankshaft detector or a processing unit, which is associated and conflated with the crankshaft detector for the purposes of the present disclosure, is able to produce a 'tooth' event d for each of the N teeth of the crankshaft toothed wheel. Such a 'tooth' event d typically corresponds to an edge for each tooth. Given the large number N of teeth present on the crankshaft toothed wheel, a single edge per tooth, out of the rising edge or the falling edge, may be kept. The falling edge is conventionally used to form the 'tooth' event d. This scenario is used for the remainder of the description.

The crankshaft detector is also able to produce a 'revolution' event T when it detects the revolution marker.

The profile of the teeth of the crankshaft toothed wheel is symmetrical. It therefore does not make it possible to ascertain the direction of rotation of the crankshaft toothed wheel and of the crankshaft. The direction of rotation of the engine, and therefore of the crankshaft and of the camshaft, is assumed to be normal, initially on startup, when the synchronization method is implemented. However, this direction of rotation may be reversed in some circumstances, making the engine rotate in the reverse direction.

To simplify the description, it is assumed that the 'tooth' events d are produced on falling edges. An identical reasoning could be applied for rising edges.

At the instant of the reversal of the direction of rotation, the crankshaft detector sees a first, falling edge, since the 'tooth' events d are falling edges, and then a last cavity, where the rotation is stopped in a first scenario. As an alternative, in a second scenario, the rotation continues and the crankshaft detector sees another last rising edge, which is therefore ignored as it is rising, preceding a last tooth where the rotation is stopped.

When the crankshaft toothed wheel sets off in the other direction again, in the first scenario, the crankshaft detector sees, in the other direction, the start of the last cavity. It then sees a rising, edge, which is therefore ignored as it is rising, which is simply the last falling edge seen in the other direction. It then sees a tooth and a falling edge, which forms a new 'tooth' event d.

When the crankshaft toothed wheel sets off in the other direction again, in the second scenario, the crankshaft detector sees, in the other direction, the start of the last tooth. It then sees a falling edge, which forms a new 'tooth' event d. This falling edge is simply the last rising edge seen in the other direction.

The result of this is that the last falling edge seen before the change of direction and the first following falling edge seen after the change of direction produce 'tooth' events d that are more often than not closer to or further apart from one another than two 'tooth' events d produced by two successive teeth seen in one and the same direction of rotation. Such a variation in the distance/periodicity between two successive 'tooth' events d during a change of direction, in comparison with a prior distance/periodicity in one and the same direction of rotation, is able to be identified by the crankshaft detector, which therefore produces a 'missing tooth' event DD.

Certain processing algorithms make it possible to avoid confusing a 'revolution' event T with a 'missing tooth' event DD.

According to one common but non-mandatory embodiment, the crankshaft toothed wheel is angularly divided equally into 60 regular teeth. Two consecutive teeth are removed so as to form the revolution marker. This leads to a signal CRK, as seen by the crankshaft detector, as illustrated in the upper part of FIG. 1. The signal CRK periodically has a 'revolution' event T at the 2 missing teeth and, more precisely, at the 1st tooth following the two missing teeth, followed by 57 'tooth' events d, as long as the crankshaft is rotating in one and the same direction. It may be noted that the number of effective teeth is 58. However, the 'revolution' event coincides with a first 'tooth' event. Therefore, there are 57 following 'tooth' events.

Following detection of a 'revolution' event T, a new 'revolution' event T is expected one crankshaft toothed wheel revolution later. It is advantageously verified that this new 'revolution' event T is situated within a window of N=58+/−2 'tooth' events d, including the 'tooth' event coinciding with the 'revolution' event, after the preceding 'revolution' event T. The lack of verification of this condition, that the new 'revolution' event T arrives too early or too late, could be used to detect an error.

In order to avoid confusing a 'revolution' event T with a 'missing tooth' event DD, a similar window of N=58+/−n=2 'tooth' events d after each 'revolution' event T is used, in which it is not possible to produce a 'missing tooth' event DD.

As soon as a first 'revolution' event T is detected, the angular position of the crankshaft toothed wheel, and therefore of the crankshaft, is known with an accuracy that is inverse to the total number of teeth N+2, including the two missing teeth, of the crankshaft toothed wheel, i.e. that is all the more accurate the larger the number N of effective teeth or the total number N+2 of teeth. The crankshaft is synchronized. It is therefore advantageous for the crankshaft toothed wheel to comprise a large number N of teeth.

However, for a four-stroke engine, a crankshaft performs exactly two revolutions per engine cycle. Therefore, ascertaining the angular position of the 'revolution' marker and the synchronization of the crankshaft are not enough to indicate the angular position of the engine, since said position is known with an uncertainty of one revolution out of two.

In order to specify which revolution out of two the engine is on, use may be made of a camshaft sensor.

A camshaft sensor or CAM makes it possible to ascertain the angular position of a camshaft. A camshaft performs, synchronously with the crankshaft, one revolution per engine cycle. Therefore, ascertaining the angular position of a camshaft provides information regarding the angular position of the engine. The determination of the angular position of the camshaft does not have to be very accurate in that it is useful above all for removing doubt by specifying on which revolution out of two the crankshaft is rotating. The accuracy of the angular position of the engine is provided by the accuracy of the crankshaft sensor.

To ascertain the angular position of the camshaft, the camshaft sensor CAM comprises a camshaft toothed wheel and a camshaft detector arranged facing said camshaft toothed wheel and able to detect a presence/absence of material and thus to detect a tooth or a slot. The camshaft toothed wheel is joined to the camshaft so as to rotate therewith, whereas the camshaft detector is fixed. The camshaft toothed wheel comprises a small number of teeth that are advantageously irregular.

The small number P of teeth of the camshaft toothed wheel does not make it possible to accurately ascertain the angular position of the camshaft and therefore of the engine. However, a camshaft performs exactly one revolution per engine cycle. Therefore, this feature makes it possible to remove doubt with regard to which crankshaft revolution out of two is involved and thus, alongside the information obtained from the crankshaft sensor, to completely determine the angular position of the engine.

Said removal of doubt/determination of the crankshaft revolution out of two is achieved by identifying the teeth and slots of the camshaft toothed wheel on the basis of their respective length, resulting from a known camshaft toothed wheel profile. This identification advantageously benefits from the irregularity of the teeth of the camshaft toothed wheel.

The camshaft detector positioned facing the camshaft toothed wheel is able to detect a presence of material facing a tooth and an absence of material facing a cavity or slot. The camshaft detector or a processing unit, which is associated and conflated with the camshaft detector for the purposes of the present disclosure, is able to produce two events: 'tooth start' and 'tooth end' for each of the teeth of the camshaft toothed wheel. A 'tooth start' event typically corresponds to a rising edge of a tooth. A 'tooth end' event typically corresponds to a falling edge of a tooth. Given the small number P of teeth present on the camshaft toothed wheel, all of the edges, rising and falling, are kept.

By correlating a signal CAM, coming from a camshaft sensor, with a signal CRK, coming from a crankshaft sensor, it is possible, eliminating the time, to calibrate a camshaft signal angularly rather than temporally.

It should be noted here that the angles that are used are, by convention, referenced in relation to an engine cycle, i.e. modulo 720°. They are therefore double the effective angles of rotation for the camshaft or its toothed wheel. Thus, for example, when it is written that a small tooth PD1, PD2 has a length/angular extent of 44°, a small tooth effectively occupies, on the camshaft toothed wheel, an angular sector of 22°.

Equipped with such an angular calibration, it is possible, by comparing the angular lengths of the teeth, the angular lengths of the cavities, the angular distance between a preceding 'revolution' event T and the first tooth or the first cavity, and/or the angular distance between the last tooth or the last cavity and a following 'revolution' event T, with a known profile of the camshaft toothed wheel, to determine, using any form recognition method, the angular position of the camshaft toothed wheel.

According to one possible embodiment, the camshaft toothed wheel comprises four irregular teeth and four cavities separating them that are also irregular, i.e. a first small tooth PD1, followed by a first small cavity PC1, followed by a first large tooth GD1, followed by a second small cavity PC2, followed by a second large tooth GD2, followed by a first large cavity GC1, followed by a second small tooth PD2, followed by a second large cavity GC2. The small teeth PD1, PD2 have a length/angular extent of 44°, the small cavities PC1, PC2 have a length/angular extent of 34°, the large teeth GD1, GD2 have a length/angular extent of 146°, and the large cavities GC1, GC2 have a length/angular extent of 136°. The camshaft toothed wheel corresponds to a total extent (for one revolution) of 720°. The start or rising edge of the first small tooth PD1 is situated in this case 76° after a 'revolution' event T of the crankshaft toothed wheel, but this angular distance may vary depending on the calibration of the distribution. This produces a signal CAM as illustrated in the lower part of FIG. 1.

Using the illustrative embodiment of the camshaft toothed wheel described above as a basis, a description will now be given of one embodiment, termed fast mode, for determining the angular position of the camshaft. The aim of the fast mode is to determine a match between the signal CAM and the profile of the camshaft toothed wheel as quickly as possible so as to synchronize the engine as quickly as possible. Therefore, synchronization is confirmed as soon as a match is able to be observed.

The principle consists in using, after detection of a 'revolution' event, each 'tooth start' and/or 'tooth end' event produced, and its angular distance from the preceding 'revolution', 'tooth start' or 'tooth end' event, to eliminate half of the possible candidate 'tooth start' or 'tooth end' events. Thus, with eight candidates, three events are generally enough to determine an identification.

Thus, with reference to FIG. 2, in which the engine is rotating continuously in the same normal direction, a 'revolution' event T is produced, by the crankshaft sensor, at the instant t11.

At the instant t12, a first event is produced by the camshaft sensor. As this is a 'tooth start' event, the important information is in this case the direction of the edge. This 'tooth start' is a rising edge and corresponds to the start of one of the four teeth PD1, PD2, GD1, GD2, and eliminates the four tooth ends.

At the instant t13, a second event is produced. This is a 'tooth end'. The important information is in this case the angular distance in relation to the preceding event, i.e. 44°. Such an angular length corresponds to that of a small tooth PD1, PD2, thus eliminating the two large teeth GD1, GD2 as candidates.

At the instant t14, a third event is produced. This is a new 'tooth start' associated with an angular distance, in relation to the preceding event, of 34°. Such an angular length corresponds to that of a small cavity PC1, PC2, thus eliminating the two large cavities GC1, GC2 as candidates.

At this stage, the two recognized successive forms: a small tooth followed by a small cavity, which can only be the sequence first small tooth PD1 followed by the first small cavity PC1, uniquely determine the angular position of the camshaft. Synchronization is achieved.

However, it is preferable to continue so as to increase the level of confidence in the result obtained. With the identification of the profile of the camshaft toothed wheel being correct in this case, all of the future expectations are confirmed.

At the instant t15, another event is produced. This is a 'tooth end' event associated with an angular distance, in relation to the preceding event, of 146°. Such an angular length corresponds to that of a large tooth GD1, GD2. This confirms the first large tooth GD1 expected following the sequence PD1, PC1.

At the instant t16, another event is produced. This is a 'tooth start' associated with an angular distance, in relation to the preceding event, of 34°. Such an angular length corresponds to that of a small cavity PC1, PC2. This confirms the second small cavity PC2 expected afterwards.

With the teeth PD1, PD2, GD1, GD2 and the cavities PC1, PC2, GC1, GC2 having two lengths that are clearly distinguished between small and large, it is easy to discriminate between the two lengths with only the average value. Thus, for example, for a tooth, a small tooth has a length of 44° and a large tooth has a length of 146°. An average length of 95° may serve as a discriminating value: a tooth with a length of less than 95° is deemed to be small, whereas a tooth with a length of more than 95° is deemed to be large. As an alternative, so as to better detect an error while at the same time taking into account that variability of the device is still possible, it is advantageous to consider a tolerance around nominal values. Thus, with an illustrative tolerance of 5°, a tooth with a length of between 39 and 49° is deemed to be small, a tooth with a length of between 141 and 151° is deemed to be large, and any other length, in particular of between 49 and 141°, but also of less than 39° or more than 151°, triggers an error and interrupts the process of determining the angular position of the camshaft by identification of the profile.

According to one embodiment, in the event of an error during the determination of the angular position of the camshaft, the determination of the angular position of the camshaft is simply resumed, in fast mode, starting from the error, by eliminating all of the scenarios created previously and by analyzing the following events. Such an approach may be satisfactory in that an erratic point is often isolated and may produce an isolated error. The second instance of the fast mode thus makes it possible, more often than not, to perform error-free synchronization.

However, such an operating mode may be deceived, in a detrimental manner, for example, if the engine changes its direction of rotation and rotates in the reverse direction. Now, if an engine is deemed to be synchronized, while it is rotating in the reverse direction, an injection of fuel may be ordered, which may lead to adverse effects for the engine.

A description will now be given, with reference to FIG. 3, in which such an operating mode, carrying out a new fast mode following an error, may lead to synchronization that is not satisfactory in that the engine is rotating in the reverse direction.

FIG. 3 illustrates the two signals CRK and CAM as a function of time. In this case, the engine is initially rotating in the normal direction. This direction reverses at the instant t25, as detected by a 'missing tooth' event DD.

A 'revolution' event T is produced, by the crankshaft sensor, at the instant t21.

At the instant t22, a first event is produced by the camshaft sensor. As this is a 'tooth start' event, the important information is in this case the direction of the edge. This 'tooth start' is a rising edge and corresponds to the start of one of the four teeth PD1, PD2, GD1, GD2, and eliminates the four tooth ends.

At the instant t23, a second event is produced. This is a 'tooth end'. The important information is in this case the angular distance in relation to the preceding event, i.e. 44°. Such an angular length corresponds to that of a small tooth PD1, PD2, thus eliminating the two large teeth GD1, GD2 as candidates.

At the instant t24, a third event is produced. This is a new 'tooth start' associated with an angular distance, in relation to the preceding event, of 34°. Such an angular length corresponds to that of a small cavity PC1, PC2, thus eliminating the two large cavities GC1, GC2 as candidates.

At the instant t25, the camshaft toothed wheel changes its direction of rotation.

At the instant t26 a falling edge is observed. On account of the change of direction of rotation, this falling edge is in fact the counterpart of the rising edge observed at the instant t24. However, this falling edge is interpreted as a 'tooth end' event. This event is associated with an angular distance, in relation to the preceding event, of 78°. Such an angular length does not correspond to that of a tooth; neither a large tooth GD1, GD2 nor a small tooth PD1, PD2. It is therefore concluded that there is an impossibility and a failure to determine the angular position of the camshaft, also called synchronization error.

The determination of the angular position of the camshaft is then resumed, in fast mode, starting from the next event.

At the instant t27, a rising edge is observed. On account of the change of direction of rotation, this rising edge is in fact the counterpart of the falling edge observed at the instant t23. However, this rising edge is interpreted as a 'tooth start' event corresponding to the start of one of the four teeth PD1, PD2, GD1, GD2. This eliminates the four tooth ends.

At the instant t28, a falling edge is observed. On account of the change of direction of rotation, this falling edge is in fact the counterpart of the rising edge observed at the instant t22. However, this falling edge is interpreted as a 'tooth end' event. The angular distance, in relation to the preceding event, is 44°. Such an angular length corresponds to that of a small tooth PD1, PD2, thus eliminating the two large teeth GD1, GD2 as candidates.

At the instant t29, a new revolution marker is detected. On account of the change of direction of rotation, this revolution marker is in fact the counterpart of the revolution marker observed at the instant t21. However, it is interpreted as a new 'revolution' event T. If a verification of distance to the last 'revolution' event T is applied, an effective distance of in this case 58 'tooth' events d may be confirmed with a test over a window of N=58 teeth toleranced by +/−n=2 teeth. The angular distance observed between the last event, occurring at the instant t28, and this revolution marker is 78°. This may be accepted provided that a certain tolerance is applied, the expected theoretical angular distance being 56°. The small tooth detected previously, between t27 and t28, is then identified as the second small tooth PD2 and the cavity following the instant t28 is then identified as the second large cavity GC2.

With an identification having been able to be found, the angular position of the camshaft is then deemed to be determined, and the engine is considered to be synchronized even though it is rotating, from the instant t25, in the reverse direction. This is an example of a problem that may occur when repeating a determination in fast mode.

In order to prevent such a problem, an aspect of the invention proposes to consider a 'missing tooth' event DD as a suspected change of direction of rotation. Only one suspicion is kept since, on account of the mode of production of a 'missing tooth' event DD, such an event may also be produced in the event of drastic slowing of the engine, in the event of an engine stutter or else in the event of a very fast back-and-forth change of direction of rotation, or a double change of direction. In any case, the engine ultimately rotates in the normal direction and does not risk posing a problem for synchronization.

A failure when determining the angular position of the camshaft is considered to be a confirmation that the engine has effectively changed its direction of rotation.

If the two conditions are present: 'missing tooth' event DD and failure to determine the angular position of the camshaft, the fact that the engine is rotating in the reverse direction is proven/confirmed. Therefore, in such a case, the method for determining the angular position of the camshaft is no longer performed in fast mode, at the risk of being deceived, but is, by contrast, performed in slow mode.

The slow mode requires determination of the angular position of the camshaft by identifying all of the events and their respective angular distance from the profile of the camshaft toothed wheel over one complete revolution of said camshaft, i.e. over two revolutions of the crankshaft. Such a slow mode is not able to be deceived and is only able to lead to a failure when the engine rotates in the reverse direction. There is therefore no risk of synchronization as long as the engine has not resumed a normal direction of rotation.

A description will now be given of an attempt to determine the angular position of the camshaft, with reference to FIGS. 3 and 4, in which the engine is initially rotating in the normal direction, before changing its direction of rotation at the instant t25, as detected by a 'missing tooth' event DD.

As in the previous description, a 'revolution' event T is produced, by the crankshaft sensor, at the instant t21. At the instant t22, a 'tooth start' event is identified as a start of one of the four teeth. PD1, PD2, GD1, GD2. At the instant t23, a 'tooth end' event, separated from the previous one by 44°, identifies a small tooth PD1, PD2, thus eliminating the two large teeth GD1, GD2 as candidates. At the instant t24, a 'tooth start' event, separated from the previous one by 34°, identifies a small cavity PC1, PC2, thus eliminating the two large cavities GC1, GC2 as candidates. At the instant t25, a 'missing tooth' event DD is produced, leading to the assumption that the shaft toothed wheel has changed its direction of rotation. At the instant t26, a 'tooth end' event, separated from the previous one by 78°, is produced. Such an angular length does not correspond to that of a tooth; neither a large tooth GD1, GD2 nor a small tooth PD1, PD2. It is therefore concluded that there is an impossibility and a failure to determine the angular position of the camshaft.

Such a failure to determine the angular position of the camshaft confirms the fact, assumed since the 'missing tooth' event DD, that the engine is rotating in the reverse direction.

Therefore, according to the invention, it follows that the determination of the angular position of the camshaft is then resumed, but in slow mode, starting from the next event.

At the instant t27, a rising edge is observed. It is interpreted as a 'tooth start' event corresponding to the start of one of the four teeth PD1, PD2, GD1, GD2. This eliminates the four tooth ends.

At the instant t28, a falling edge is observed. It is interpreted as a 'tooth end' event. The angular distance, in relation to the preceding event, is 44°. Such an angular length corresponds to that of a small tooth PD1, PD2, thus eliminating the two large teeth GD1, GD2 as candidates.

At the instant t29, a new revolution marker is detected. It is interpreted as a new 'revolution' event T. If a verification of distance to the last 'revolution' event T is applied, an effective distance of in this case 58 'tooth' events d may be confirmed with a test toleranced by 58+/−2 teeth. The angular distance observed between the last event, occurring at the instant t28, and this revolution marker is 78°. This may be accepted provided that a certain tolerance is applied, the expected theoretical angular distance being 56°. The small tooth detected previously, between t27 and t28, is then identified as the second small tooth PD2 and the cavity following the instant t28 is then identified as the second large cavity GC2.

In contrast to the case described above, in which, in fast mode, the angular position of the camshaft may be deemed to be determined, the determination must, according to the invention, be performed in slow mode. The subsequent events are therefore also analyzed.

Figure 4:
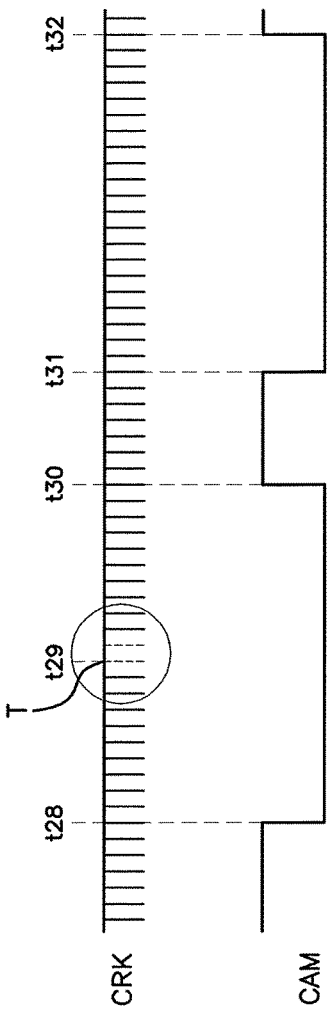
FIG. 4 shows an extension of the timing diagram of FIG. 3.

The description continues with reference to FIG. 4, which extends FIG. 3 in terms of time.

At the instant t30, a rising edge is observed. On account of the change of direction of rotation, this rising edge is in fact the counterpart of a falling edge prior to the instant t21 and that is therefore not visible. However, this rising edge is interpreted as a 'tooth start' event. The angular distance, in relation to the preceding 'revolution' event, is 54°. The angular distance, in relation to the preceding 'tooth end' event, is 126°. Such angular lengths, to within a certain tolerance, are compatible with a large cavity with a nominal length of 136° and with the position of a second large cavity GC2 in relation to a revolution marker, and thus confirm the previous scenario of the second large cavity GC2 between the instant t28 and the instant t30.

At the instant t31, a falling edge is observed. On account of the change of direction of rotation, this falling edge is in fact the counterpart of a rising edge that is not visible. This falling edge is interpreted as a 'tooth end' event. The angular distance, in relation to the preceding event, is 42°. Such an angular length corresponds to that of a small tooth. In the profile of the camshaft toothed wheel, this may correspond to the first small tooth PD1 that follows the second large cavity GC2.

At the instant t32, a rising edge is observed. On account of the change of direction of rotation, this rising edge is in fact the counterpart of a falling edge that is not visible. This rising edge is interpreted as a 'tooth start' event. The angular distance, in relation to the preceding 'tooth end' event, is 136°. This corresponds to the angular length of a large cavity. Now, depending on the profile of the camshaft toothed wheel, following the elements identified in sequence: PD2 between t27 and t28, followed by GC2 between t28 and t30, 'revolution' marker at t29, and PD1 between t30 and t31, a small cavity, the first small cavity PC1, is expected. This is impossible. The determination of the angular position of the camshaft thus results in a failure.

This shows that the slow mode is not able to erroneously conclude that there is synchronization while the engine is rotating in the reverse direction.

The method continues by keeping a determination of the angular position of the camshaft, still in slow mode. Thus, as long as the engine is rotating in the reverse direction, it is not possible to result in synchronization. As soon as the engine rotates in the normal direction again, the determination in slow mode is able to result in synchronization.

The invention claimed is:

1. A method for determining an angular position of an engine by way of a crankshaft sensor comprising a crankshaft detector facing a crankshaft toothed wheel, performing two revolutions per engine cycle, and comprising a large number of regular teeth and a revolution marker, the crankshaft detector being able to produce a 'tooth' event corresponding to an edge for each of said teeth, a 'revolution' event for the revolution marker, and a 'missing tooth' event when two successive 'tooth' events are abnormally far apart, and of a camshaft sensor comprising a camshaft detector facing a camshaft toothed wheel, performing one revolution per engine cycle, and comprising a small number of irregular teeth, the camshaft detector being able to produce a 'tooth start' event for each rising edge and a 'tooth end' event for each falling edge, the method comprising:
producing the 'revolution' event by the crankshaft sensor,
determining with the camshaft sensor the angular position of the camshaft by identifying the 'tooth start' and 'tooth end' events produced by the camshaft detector following said 'revolution' event, in a fast mode, over at most one crankshaft revolution, wherein if a 'missing tooth' event is produced by the crankshaft detector after the 'revolution' event and if the determination of the angular position of the camshaft fails, the method continues with a step of:
determining with the camshaft sensor the angular position of the camshaft by identifying the 'tooth start' and 'tooth end' events produced by the camshaft detector, in a slow mode, over at least two crankshaft revolutions.

2. The method as claimed in claim 1, wherein the crankshaft toothed wheel is regularly angularly divided into 60 teeth positions and comprises a large number of teeth equal to 58, and 2 consecutive missing teeth forming the revolution marker.

3. The method as claimed in claim 1, wherein the camshaft toothed wheel comprises a small number of teeth equal to 4, comprising a first small tooth, followed by a first small cavity, followed by a first large tooth, followed by a second small cavity, followed by a second large tooth, followed by a first large cavity, followed by a second small tooth, followed by a second large cavity.

4. The method as claimed in claim 1, wherein a 'missing tooth' is not able to be produced within a window whose extent is said large number of teeth toleranced by +/− a tolerance of 2 teeth following a 'revolution' event.

5. The method as claimed in claim 1, wherein a 'missing tooth' is not able to be produced within a window whose extent is said large number of teeth toleranced by +/− a tolerance of teeth following a 'revolution' event.

6. The method as claimed in claim 5, wherein the crankshaft toothed wheel is regularly angularly divided into 60 teeth positions and comprises a large number of teeth equal to 58, and 2 consecutive missing teeth forming the revolution marker.

7. The method as claimed in claim 1, wherein the determination of the angular position of the camshaft by identification in the slow mode is continued in the slow mode for as long as the determination of the angular position of the camshaft fails.

8. The method as claimed in claim 7, wherein a 'missing tooth' is not able to be produced within a window whose extent is said large number of teeth toleranced by +/− a tolerance of teeth following a 'revolution' event.

9. The method as claimed in claim 7, wherein the crankshaft toothed wheel is regularly angularly divided into 60 teeth positions and comprises a large number of teeth equal to 58, and 2 consecutive missing teeth forming the revolution marker.

10. The method as claimed in claim 7, wherein a 'missing tooth' is not able to be produced within a window whose extent is said large number of teeth toleranced by +/− a tolerance of 2 teeth following a 'revolution' event.

* * * * *